United States Patent
Krishna et al.

(10) Patent No.: US 8,953,592 B2
(45) Date of Patent: Feb. 10, 2015

(54) NETWORK ADDRESS TRANSLATION FOR APPLICATION OF SUBSCRIBER-AWARE SERVICES

(71) Applicant: Juniper Networks, Inc., Sunnyvale, CA (US)

(72) Inventors: Gopi Krishna, Tracy, CA (US); Apurva Mehta, Cupertino, CA (US); Ananda Sathyanarayana, Santa Clara, CA (US); Bobby Vandalore, Milpitas, CA (US); Dinesh Bakiaraj, Sunnyvale, CA (US); Vignesh Chinnakkannu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 173 days.

(21) Appl. No.: 13/631,704

(22) Filed: Sep. 28, 2012

(65) Prior Publication Data

US 2014/0092899 A1    Apr. 3, 2014

(51) Int. Cl.
*H04L 12/28*    (2006.01)
*H04L 29/12*    (2006.01)
*H04L 12/14*    (2006.01)
*H04W 8/26*     (2009.01)

(52) U.S. Cl.
CPC .......... *H04L 61/203* (2013.01); *H04L 61/2514* (2013.01); *H04L 29/12245* (2013.01); *H04L 61/2517* (2013.01); *H04L 12/1407* (2013.01); *H04L 61/2567* (2013.01); *H04W 8/26* (2013.01)
USPC ....................................................... 370/389

(58) Field of Classification Search
CPC . H04L 61/203; H04L 29/1233; H04L 67/303; H04L 67/2819; H04W 80/12
See application file for complete search history.

(56) References Cited

U.S. PATENT DOCUMENTS

| | | | | |
|---|---|---|---|---|
| 2001/0047414 | A1* | 11/2001 | Yoon et al. | 709/225 |
| 2005/0223095 | A1* | 10/2005 | Volz et al. | 709/225 |
| 2006/0248225 | A1* | 11/2006 | Batz et al. | 709/238 |
| 2011/0047256 | A1* | 2/2011  | Babu et al. | 709/223 |
| 2011/0099293 | A1* | 4/2011  | Ait-Ameur et al. | 709/245 |

(Continued)

OTHER PUBLICATIONS

3GPP TSG SA WG2, "Discussion on OMA LS on SUPL Authentication for LTE," Andrew Corporation, Meeting #80, Aug. 30-Sep. 3, 2010, Brunstad, Norway, 4 pp.

(Continued)

*Primary Examiner* — Hoon J Chung
*Assistant Examiner* — Yaotang Wang
(74) *Attorney, Agent, or Firm* — Shumaker & Sieffert, P.A.

(57) ABSTRACT

In general, techniques are described for informing services nodes of private network address information in order to apply subscriber-aware services with the services node. In some examples, a services node includes an Authentication, Authorization, and Accounting (AAA) interface to receive a AAA message, wherein the AAA message has been extended from a AAA protocol to specify a private network address of a subscriber device authenticated to an access network by the AAA server and assigned the private network address that is not routable external to the access network. A mapping module associates the public network address of subscriber data traffic with the private network address received by the AAA message. One or more service modules select one or more of a plurality of subscriber policies using the associated private network address and apply services to the subscriber data traffic in accordance with the selected subscriber policies.

30 Claims, 6 Drawing Sheets

(56) References Cited

U.S. PATENT DOCUMENTS

| | | | | |
|---|---|---|---|---|
| 2011/0153854 | A1* | 6/2011 | Chickering | 709/229 |
| 2011/0282996 | A1* | 11/2011 | Zahavi et al. | 709/226 |
| 2012/0136976 | A1* | 5/2012 | Krishnan et al. | 709/223 |
| 2013/0166667 | A1* | 6/2013 | Carr et al. | 709/206 |
| 2013/0166763 | A1* | 6/2013 | Forsback | 709/228 |

OTHER PUBLICATIONS

3GPP TR 23.975 V11.0.0, 3rd Generation Partnership Project, "Technical Specification Group Services and System Aspects, IPv6 Migration Guidelines," Release 11, 3GPP Organizational Partners, Jun. 10, 2011, 41 pp.

European Search Report from European counterpart application No. 13186302.9, dated Jan. 1, 2014, 8 pp.

3GPP TS 23.401 V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

3GPP TS 23.203 V11.6.0, 3rd Generation Partnership Project; Technical Specification Group Services and System Aspects; Policy and Charging control architecture (Release 11), Jun. 2012, 177 pp.

P. Calhoun et al., "Diameter Base Protocol," Network Working Group, RFC 3588, Sep. 2003, 147 pp.

Rigney et al., "Remote Authentication Dial in User Service (RADIUS)," Network Working Group of the Internet Engineering Task Force (IETF), Request for Comments 2865, Jun. 2000, 71 pp.

Rigney, "RADIUS Accounting," Network Working Group of the IETF, Request for Comments 2866, Jun. 2000, 27 pp.

Chiba et al., "Dynamic Authorization Extensions to Remote Authentication Dial in User Service (RADIUS)," Network Working Group, RFC 3576, Jul. 2003, 29 pp.

U.S. Appl. No. 13/248,825, filed Sep. 29, 2011 entitled High-Availability Mobile Gateways Having Interchassis Non-Uniform Service Unit Redundancy.

U.S. Appl. No. 13/332,163, filed Dec. 20, 2011 entitled Virtual Private Networking With Mobile Communication Continuity.

U.S. Appl. No. 13/326,903, filed Dec. 15, 2011 entitled Deterministic Network Address and Port Translation.

U.S. Appl. No. 13/471,252, filed May 14, 2012 entitled Inline Network Address Translation Within a Mobile Gateway Router.

"Service Delivery Gateway—Addressing the Needs of Gi Networks in the Smartphone Revolution," Fact Sheet, Juniper Networks, Feb. 2011, 4 pp.

Traffic Mediation 2012, "The Right Way to Process Content in 4G Networks," Openwave, Dec. 2011, 12 pp.

U.S. Appl. No. 12/432,366, filed Apr. 29, 2009 entitled Scalable Security Services for Multicast in a Router Having Integrated Zone-Based Firewall.

* cited by examiner

NETWORK ADDRESS TRANSLATION FOR APPLICATION OF SUBSCRIBER-AWARE SERVICES

TECHNICAL FIELD

The invention relates to computer networks and, more specifically, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server or other device in each subnet may be responsible for allocating these network addresses in accordance with a network address allocation protocol, such as a dynamic host configuration protocol (DHCP).

Access networks often assign private network addresses to the subscriber device (e.g., cable modems, DLS modems, mobile devices) used by their customers. For example, a DHCP server or RADIUS server may dynamically assign a private address to a subscriber device upon establishing a network connection for the subscriber device. When not in use, the network connection is torn down and the private address is returned to a pool of provider addresses utilized within the access network. These private addresses may not be routable outside the access network. Instead, a network address translation (NAT) device translates the private addresses used by subscriber device to public network addresses that are routable within a public network, such as the Internet.

SUMMARY

In general, techniques are described for informing services nodes of private network address information in order to apply subscriber-aware services with the services node. The techniques may be well suited, for example, for access networks where the services node is positioned upstream from the access network and, therefore, associates public network addresses within subscriber traffic with private network addresses or other identifiers for the individual subscribers to apply the subscriber-aware services.

As one illustrative example, a network access gateway or other device of an access network may allocate, to each new subscriber device attached to the access network, a private network address for the access network that the network access gateway maps to a public network address for use in routing subscriber data traffic outside of the access network. The network access gateway may in some cases map multiple private network addresses to the public network address in this way. The network access gateway publishes this mapping to an Authentication, Authorization, and Accounting (AAA) server in a AAA message. The AAA server is configured to reflect the mapping to any requesting device including, for instance, to the services node. The services node uses the mapping to determine a private network address and corresponding subscriber for subscriber data traffic traversing the services node. As a result, the services node may apply services that are subscriber-aware, i.e., differentiated according to the identity of the subscriber or subscriber group, to subscriber data traffic despite being logically located outside of the access network and despite the subscriber data traffic being sourced by/destined to a public network address.

In one aspect, a method for applying subscriber services to subscriber data traffic includes receiving, with a services node, an Authentication, Authorization, and Accounting (AAA) message conforming to a AAA protocol, wherein the AAA message has been extended from the AAA protocol to specify a private network address of a subscriber device authenticated to an access network and assigned the private network address that is not routable external to the access network. The method also includes receiving subscriber data traffic that is sourced by or destined to a public network address that is routable by a packet data network. The method also includes associating the public network address of the subscriber data traffic with the private network address received by the AAA message. The method further includes selecting one or more policies using the private network address. The method also includes applying the service to the subscriber data traffic associated with the private network address in accordance with the policies.

In another aspect, a method for publishing private network address information includes receiving, with a network access gateway of an access network, a session request from a subscriber device for a service session with a packet data network. The method also includes associating a public network address with a private network address for the subscriber device, wherein the public network address is routable within the packet data network. The method further includes sending the private network address and the public network address to an Authentication, Authorization, and Accounting (AAA) server in a AAA message, wherein the AAA message conforms to a AAA protocol that has been extended from the AAA protocol to specify the private network address for the subscriber device. The method also includes receiving subscriber data traffic associated with the public network address associated with the subscriber device. The method further includes translating the public network address to the private network address according to the association of the public network address with the private network address for the subscriber device. The method also includes, responsive to translating the public network address to the private network address, forwarding the subscriber data traffic toward the private network address.

In another aspect, a method for publishing private network address information to a services node includes receiving, with an Authentication, Authorization, and Accounting (AAA) server, a AAA message that comprises a private network address for a subscriber device attached to an access network. The method also includes reflecting, as a reflected AAA message, the AAA message from the AAA server to a services node that is located on an interface between the access network and a packet data network to announce the private network address for the subscriber device to the services node.

In another aspect, a services node includes a control unit having a processor. An Authentication, Authorization, and Accounting (AAA) interface of the control unit receives a AAA message conforming to a AAA protocol, wherein the AAA message has been extended from the AAA protocol to specify a private network address of a subscriber device authenticated to an access network by the AAA server and assigned the private network address that is not routable external to the access network. The services node also includes one or more network interface cards to receive subscriber data traffic that is sourced by or destined to a public network address that is routable by a packet data network. The services node also includes a mapping module of the control unit to associate the public network address of the subscriber data traffic with the private network address received by the AAA message. The services node also includes one or more subscriber policies. The services node also includes one or more service modules to select one or more of the subscriber policies using the associated private network address and apply one or more of a plurality of services to the subscriber data traffic associated with the private network address in accordance with the selected subscriber policies.

In another aspect, a network access gateway for an access network includes a control unit having a processor. The network access gateway also includes one or more network interface cards that receive a session request from a subscriber device for a service session with a packet data network. The control unit associates a public network address with a private network address for the subscriber device, wherein the public network address is routable within the packet data network. The network access gateway also includes a Authentication, Authorization, and Accounting (AAA) interface to send the private network address and the public network address to a AAA server in a AAA message, wherein the AAA message conforms to a AAA protocol that has been extended from the AAA protocol to specify the private network address for the subscriber device. The network interface cards receive subscriber data traffic associated with the public network address associated with the subscriber device. The control unit translates the public network address to the private network address according to the association of the public network address with the private network address for the subscriber device. The control unit, responsive to translating the public network address to the private network address, forwards the subscriber data traffic toward the private network address.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
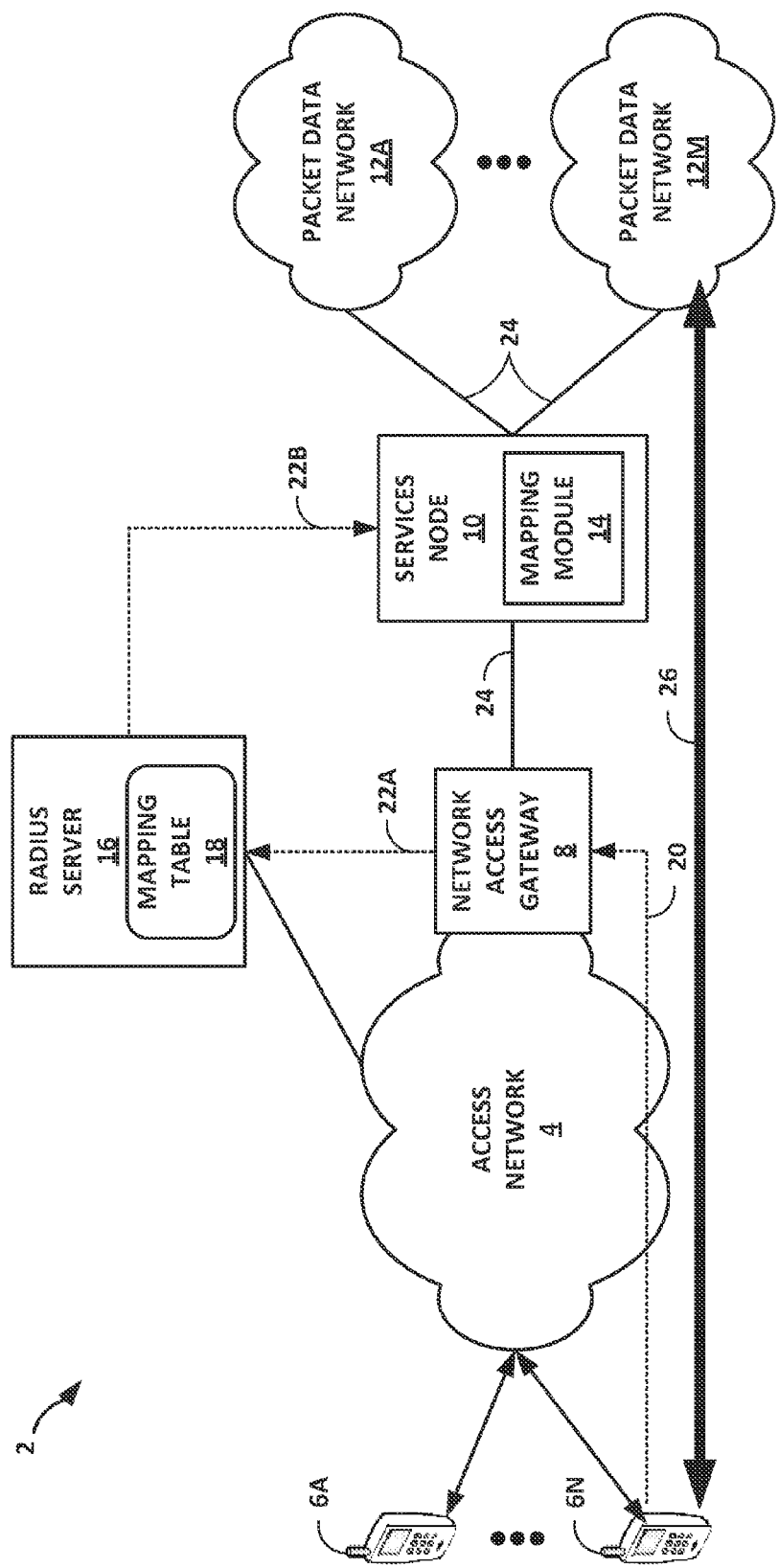
FIG. 1 is a block diagram illustrating a network system having a services node that is logically located outside of the private network address space for an access network and, in conformity to techniques described in this disclosure, maps public network addresses of subscriber data traffic to private network addresses in order to apply subscriber-aware services.

FIG. 1 is a block diagram illustrating an example network system having a services node 10 positioned upstream from an access network 4. In the example of FIG. 1, services node 10 may be viewed as logically located outside of access network 4. However, FIG. 1 is merely exemplary and the techniques described herein may be used in other network configurations to publish network address translation information to services nodes, such as where one or more of the services nodes are located within the same private address subnet as subscriber devices 6. In the example of FIG. 1, services node 10 utilizes the network address information published through RADIUS server 16 to map public network addresses within subscriber data traffic to private network addresses of subscriber devices 6 in order to apply subscriber-aware services. In this example, network system 2 includes multiple Packet Data Networks (PDNs) 12A-12M (collectively, "PDNs 12") coupled by interface 24 to access network 4 via network access gateway 8.

PDNs 12 support one or more packet-based services that are available for request and use by subscriber devices 6A-6N (collectively, "subscriber devices 6"). As examples, each of PDNs 12 may provide Internet access, bulk data delivery, voice over Internet protocol (VoIP), Internet Protocol television (IPTV), Short Messaging Service (SMS), Wireless Application Protocol (WAP) service, Telnet, and/or customer-specific application services. Each of PDNs 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates access network 4, an enterprise IP network, or some combination thereof. In various embodiments, one or more of PDNs 12 may be connected to a public WAN, the Internet, or to other networks. Each of PDNs 12 executes one or more packet data protocols (PDPs), such as IP (IPv4 and/or IPv6), X.25 or Point-to-Point Protocol (PPP), to enable packet-based transport of PDNs 12 services. One or more of PDNs 12 may alternatively be referred to as "Gi networks" or "SGi networks" where interface 24 represents a Gi or SGi interface (or "reference point") for mobile network connectivity.

Network system 2 also includes services node 10 that applies subscriber-aware services to subscriber data traffic traversing interface 24 between network access gateway 8 and PDNs 12. Because in some instances each of PDNs 12 may be deployed to provide one of Internet services, Enterprise services, smartphone services, video services (e.g., video-on-demand, cable television), and so on, each of PDNs 12 may require a different set of services. Services node 10 applies these services, which may include carrier-grade Network Address Translation (carrier-grade NAT), firewall, intrusion prevention, server load balancing, Multiprotocol Label Switching (MPLS) Virtual Private Networks (VPNs), switching and routing, video optimization, and/or data compression, for example. One or more such instances may require Deep Packet Inspection (DPI). Services node 10 may represent multiple different network devices that each apply a different subset of the services applied by services node 10. Services node 10 may receive subscriber-based policies from a policy server (not shown), such as a Policy Control and Charging Rules Function (PCRF) device, which control application of the applied services.

Network access gateway 8 functions as a gateway to services provided by PDNs 12. Accordingly, in this example, network access gateway 8 is a device that provides access to PDNs 12. For example, network access gateway 8 may represent and/or incorporate a network access gateway that provides dial-up or virtual private network (VPN) services to an enterprise LAN, a remote access server (e.g., broadband remote access server) or broadband services router that aggregates outputs from one or more Digital Subscriber Line Access Multiplexers (DSLAMs) into a higher-speed uplink to one or more of PDNs 12, a wireless access point (WAP) providing wireless physical layer access to one or more of PDNs 12, or switches that use other LAN-based (e.g., Ethernet) technologies to provide wired physical layer access to one or more of PDNs 12. In another example, network access gateway 8 may be a mobile gateway device include a plurality of service cards that implement a decentralized control plane for subscriber management for large numbers of subscriber devices 6. Example network gateways having a decentralized control plane are described in U.S. patent application Ser. No. 13/248,825, entitled HIGH-AVAILABILITY MOBILE GATEWAYS HAVING INTERCHASSIS NON-UNIFORM SERVICE UNIT REDUNDANCY, filed Sep. 29, 2011, the entire contents of which being incorporated herein.

Subscriber devices 6 connect to network access gateway 8 via access network 4 to receive connectivity to PDN 12 services for applications hosted by subscriber devices 6. Each of subscriber devices 6 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 6 may be associated with a subscriber (e.g., a human). Applications that access services provided by PDNs 12 may alternatively be referred to as "user agents." In this example, any of subscriber devices 6 may connect to any one or more of PDNs 12.

A network service provider (or other entity that administers PDNs 12) operates or in some cases leases elements of access network 4 to provide packet transport between subscriber devices 6 and network access gateway 8. Access network 4 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the 3$^{rd}$ Generation Partnership Project (3GPP), 3$^{rd}$ Generation Partnership Project 2 (3GGP/2) and the Worldwide Interoperability for Microwave Access (WiMAX) forum.

In examples of network system 2 that include a cellular access network as access network 4, network access gateway 8 may represent a mobile gateway, for example, a Gateway General Packet Radio Service (GPRS) Serving Node (GGSN), an Access Gateway (aGW), or a Packet Gateway (P-GW). In such examples, interface 24 represents a Gi or SGi interface operating over communication links to PDNs 12 for mobile network connectivity. Further details regarding mobile gateways and SGi/Gi reference points are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, the entire contents of each being incorporated herein by reference. In examples of network system 2 that include a wireline/broadband access network, network access gateway 8 may represent a Broadband Services Router (BSR) or a Broadband Remote Access Server (BRAS), for instance.

Access network 4 may include a plurality of service virtual LANs (SVLANs) that partition elements of access network (e.g., DSLAMs) into logically different networks. The elements of access network 4 may support any one or more of a variety of protocols, such as Internet Protocol (IP), Frame Relay, Asynchronous Transfer Mode (ATM), Ethernet, Ethernet/MPLS, Point-to-Point Protocol (PPP), Point-to-Point Protocol over Ethernet (PPPoE), GPRS tunneling protocol (GTP), and virtual local area network (VLAN)-related protocols, among others. Using any one or more of these protocols, any of subscriber devices 6 issue session requests to network access gateway 8 to request access to PDNs 12 services. For example, subscriber device 6A may broadcast credentials, such as a username and password, to network access gateway 8 to request access to a service provided by PDN 12A. Subscriber devices 6 may broadcast credentials using, for instance, a session request that is a PPPoE Active Discovery Initiation (PADI) packet to network access gateway 8. In some instances, subscriber devices 6 unicast credentials directly to network access gateway 8 to request a service. In some instances, e.g., in instances where access network 4 includes a cellular access network, subscriber devices 6 attach to access network 4 by issuing session requests toward access network 4 that are LTE Create Session Requests or UMTS PDP Context Requests. For other mobile network architectural embodiments of access network 6, session request represents the corresponding session request message for the architecture.

Each such session request includes a subscriber identifier that identifies the subscriber 6 that issued the session request. The subscriber identifier may represent, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a subscriber username, an MSISDN number (e.g., a "Mobile Subscriber Integrated Services Digital Network Number") or other data identifying subscriber device 6.

In the illustrated example, subscriber device 6N issues session request 20 toward access network 4. Network access gateway 8 receives session request 20 and establishes a subscriber session for subscriber device 6N to enable connectivity to one of PDNs 12. Each of subscriber devices 6 may engage multiple sessions with network access gateway 8 to receive services from any one or more of PDNs 12. In other words, a subscriber may have multiple sessions temporally in parallel and/or in series. Each service provided by network access gateway 8 to a subscriber may constitute a session, with the beginning of the session defined as the moment when service is first provided and the end of the session defined as the moment when service is ended.

While illustrated as a single message from subscriber device 6N to network access gateway 8, session request 20 may represent a plurality of messages that traverse intermediate network devices of access network 4 to identify subscriber device 6N to network access gateway 8. For example, in an LTE architecture, session request 20 may represent an initial Attach Request message issued by subscriber device 6N to an eNode B, which forwards the request to an MME. The MME may incorporate information received in the Attach Request message, including the wireless device identity, into a first Create Session Request message that the MME then sends to a serving gateway (S-GW) and that is also represented by session request 20. The S-GW generates a second Create Session Request message that incorporates information received by the S-GW in the first Create Session Request, such as the wireless device identity. The second Create Session Request message, which is sent by the S-GW to a P-GW represented by network access gateway 8, is also represented by session request 20. As another example, session request 20 may represent an Activate PDP Context Request message from subscriber device 6N to an SGSN and a Create PDP Context Request message from the SGSN to network access gateway 8 operating as a GGSN. Other mobile network architectures may have similar messaging schemes to identify subscriber device 6N to network access gateway 8 as part of an attach procedure or other procedure to establish a requested session. In addition, the initial Attach Request or Active PDP Context Request message may be responsive to a request by network access gateway 8 to subscriber device 6N to initiate a session with network access gateway 8.

In the example of FIG. 1, network access gateway 8 is configured by the network service provider (or other administrative entity) as a Remote Authentication Dial In User Service (RADIUS) client to direct network access gateway 8 to outsource authentication, authorization, and accounting (AAA) functions to specified RADIUS server 16, a AAA server that receives and processes connection requests or accounting messages sent by network access gateways. Authentication is the process of verifying a subscriber identity. Authorization is the process of determining whether and the form in which an authenticated subscriber has access to any of PDNs 12. Accounting is the process of generating records of session statistics for subscribers for billing and monitoring, for example. Although described with respect to a RADIUS server 16 and the RADIUS protocol, the techniques of this disclosure are similarly applicable to other AAA protocols, such as Diameter. Network service providers typically deploy one or more servers to manage AAA functionality for networks that offer services to one or more subscribers. The RADIUS protocol is described in Carl Rigney et al., "Remote Authentication Dial In User Service (RADIUS)," Network Working Group of the Internet Engineering Task Force (IETF), Request for Comments 2865, June 2000, which is incorporated by reference herein in its entirety. RADIUS accounting is described in Carl Rigney, "RADIUS Accounting," Network Working Group of the IETF, Request for Comments 2866, June 2000, which is incorporated by reference herein in its entirety. In another example, RADIUS server 16 may support one or more other protocols for AAA functionality, such as the Diameter protocol described in Calhoun et al., "Diameter Base Protocol," Request for Comments 3588, Network Working Group, Internet Engineering Task Force, which is incorporated herein by reference.

When network access gateway 8 receives session request 20 from subscriber device 6N to access PDN 12M, network access gateway 8 allocates a private network address for the requesting subscriber device from a pool of private network addresses that belong to a private network address space of access network 4. In the example of FIG. 1, services node 10 is not a member of the private network address space of access network 4, is unable to route packets sourced by/destined to addresses within the private network address space of access network 4, and therefore is, in this sense, logically located outside of access network 4. In some examples, network access gateway 8 outsources private network address allocation to a Dynamic Host Configuration Protocol (DHCP) server, RADIUS server 16, or another AAA server. Network access gateway 8 associates the private network address allocated to subscriber device 6N with a public network address that is routable within the PDN 12 being requested and a port range associated with the public network address. Network access gateway 8 may allocate the public network address from a pool stored by network access gateway 8 or by outsourcing the allocation to a DHCP server, RADIUS server 16, or another AAA server of the PDN 12 being requested. When network access gateway 8 receives upstream subscriber data traffic 26 for the session established responsive to session request 20, network access gateway 8 or an upstream NAT device positioned between network access gateway 8 and services node 10 performs network address translation (NAT)/network address and port translation (NAPT) to translate the private network address for subscriber device 6N to the associated public network address and port that is routable within the PDN 12 for the session, and visa-versa for downstream subscriber data traffic 26 destined for subscriber device 6N. As used herein, "NAT" may refer to NAT or NAPT.

In one example, network access gateway 8 includes a network address translation (NAT) element that provides network address translation for private network addresses routable within a service provider network to public network addresses routable within packet data networks 12. In one example, network access gateway 8 applies a source network address and port translation (NAPT) mechanism "inline" within a data plane of the network access gateway 8. For example, when routing outbound packets of subscriber data traffic from access network destined for a destination address within packet data networks 12, the NAT element within the data plane of network access gateway 8 (e.g., within a packet forwarding ASIC) applies a binding that maps private source addresses of the outbound packets to public addresses and ports. The NAT element then performs network address translation to translate the private source network address within the packet to the public network address and port number bound to the particular subscriber communication session. During this process, the NAT element within the data plane of network access gateway 8 may replace all or a portion of a header (e.g., IP or UDP header) of the packet prior to forwarding the packet to packet data networks 12. Upon receiving an inbound packet from one of packet data networks 12, the NAT element of network access gateway 8 identifies a current NAT entry for the communication session and maps the public destination network address and the destination port to the corresponding private network address and port for the communication session. The NAT element may then replace all or a portion of a header (e.g., IP or UDP header) within the packet prior to forwarding the packet to access network 4.

In one example, a public network address and port range for a subscriber is pre-allocated at the time a network connection is established in response to session request 20 prior to receiving any data traffic associated with the subscriber. For example, during login and authentication, a private network address is allocated to a subscriber device 6 from a pool of private addresses. At this time, a public network address and port range is pre-allocated for NAT bindings for subsequent communication sessions (packet flows) for the network connection. For example, a DHCP server may pre-allocate the public network address and port range when allocating the private network address for an authenticated subscriber device 6N requesting a new subscriber session. Alternatively, anchoring subscriber management service units within network access gateway 8 for the subscriber session may pre-allocate the public network address and port range from a database or pool of public addresses. Further example details for performing inline NAT within a data plane of network access gateway 8 using pre-allocated public network addresses and port ranges are described in U.S. patent application Ser. No. 13/471,252, filed May 14, 2012, and entitled "INLINE NETWORK ADDRESS TRANSLATION WITHIN A MOBILE GATEWAY ROUTER," which is incorporated herein by reference in its entirety.

Session request 20 may further include an Access Point Name (APN) that identifies one of PDNs 12 and may in some instances further identify a requested service (e.g., Internet, WAP, or multimedia messaging service (MMS)) provided by the identified PDN. In such instances, i.e., an APN-based implementation, an APN is a logical name that determines an appropriate network access gateway (e.g., a GGSN or P-GW) for subscriber device 6N and is used by the network access gateway to determine the services requested by the user and/or the address of an access point in an external PDN 12 to which subscriber data traffic 26 from subscriber device 6N should be forwarded. An APN effectively identifies a mobile VPN having its own address space in the associated one of PDNs 12 for the APN. In this sense, interface 24 may represent respective Gi/SGi interfaces for various APNs. Additional details regarding mobile VPNs are found in U.S. patent application Ser. No. 13/332,163, filed Dec. 20, 2011, and entitled "VIRTUAL PRIVATE NETWORKING WITH MOBILE COMMUNICATION CONTINUITY, which is incorporated by reference herein in its entirety. In an APN-based implementation, therefore, network access gateway 8 receives the APN that identifies one of PDNs 12 in session request 20, associates an allocated private network address for subscriber device 6N with a VPN address (a "public" network address) that is routable within the VPN for the identified one of PDNs 12. Network access gateway 8 may then perform NAT to translate the private network address for subscriber device 6N to the associated VPN address that is routable within the identified one of PDNs 12 for upstream subscriber data traffic 26 for the session, and visa-versa for downstream subscriber data traffic 26 destined for subscriber device 6N.

Continuing with the example of FIG. 1 in which a session is established in response to session request 20, network access gateway 8 sends a RADIUS protocol Access-Request to RADIUS server 16 containing attributes such as the subscriber identifier, the network access gateway 8 network address, and in some cases an identifier for the one of PDN 12 (in the illustrated example, PDN 12M) to which requesting subscriber device 6N is requesting a service session. If RADIUS server 16 includes a configuration record for the subscriber and the authorization credentials are correct, RADIUS server 16 returns a RADIUS protocol Access-Accept message to network access gateway 8. If a match is not found or a problem is found with the authentication credentials, RADIUS server 16 returns an Access-Reject message. The network access gateway 8 then establishes or terminates the session for the requesting subscriber device 6N with one of PDNs 12. Subscriber device 6 uses the session to exchange subscriber data traffic with PDN 12M.

In some examples, RADIUS server 16 may outsource some AAA functionality to one or more backend servers, such as an authentication server, external database, and/or remote RADIUS server. The authentication server may be a backend authentication server, such as an RSA SecureID system, a Structured Query Language or Lightweight Directory Access Protocol (LDAP) database server, or Home Location Register, that stores a list of subscriber accounts and subscriber account properties that can be checked by RADIUS server 16 to verify authentication credentials and queried by RADIUS server 16 to obtain subscriber account properties containing authorization and connection parameter information for subscribers. In some cases, the authentication server verifies authentication credentials on behalf of RADIUS server 16. An external database refers to a backend database that RADIUS server 16 may use to store accounting information. In some cases, RADIUS server 16 is a proxy server for a remote RADIUS server.

In accordance with techniques described herein, as part of session setup, network access gateway 8 sends to RADIUS server 16 a AAA message 22A, such as a RADIUS Accounting-Request and/or Access-Request message, that includes the private network address allocated to subscriber device 6N, and RADIUS server 16 publishes the private network address to any requesting network device in the public network, including to services node 10 in reflected AAA message 22B. RADIUS server 16 may be configured to send reflected AAA message 22B to services node 10, or may send reflected AAA message 22B in response to a request from services node 10 or in response to prior registration by services node 10 to receive such messages. Mapping module 14 of services node 10 uses the published private network address received in reflected AAA message 22B to identify subscriber device 6N based on the public network address of subscriber data traffic 26 traversing services node 10. In some examples, network access gateway 8 includes additional network address and/or port range information in AAA message 22A for the particular subscriber device 6N, which RADIUS server 16 stores to mapping table 18 and reflects to services node 10 in reflected AAA message 22B. For example, network access gateway 8 may include the public network address as well as the port range allocated to subscriber device 6N for use in applying inline NAT for subsequent communication sessions associated with the subscriber device in accordance with U.S. patent application Ser. No. 13/471,252. Mapping module 14 of services node 10 may then use the additional network address and/or port range information to identify the private network address or other identifier for subscriber device 6N from subscriber data traffic 26 destined for/sourced by the associated public network address and port number assigned to subscriber device 6N. In some examples, network access gateway 8 performs NAT/NAPT using a deterministic algorithm (also known as "deterministic NAT") to convert private network address and ports to public network addresses and ports, and visa-versa. In such examples, mapping module 14 uses an inverse of the deterministic algorithm to determine the private network address for subscriber device 6N from subscriber data traffic 26 destined for/sourced by the associated public network address of subscriber device 6N.

By applying techniques described in this disclosure, services node 10 may apply services that are subscriber-aware, i.e., differentiated according to the identity of the subscriber, to subscriber data traffic 26 despite being located upstream from NAT operations applied to the subscriber traffic sourced by or destined to the individual subscriber devices 6. In this way, the techniques may be used to apply subscriber-specific services even in network configurations where services node 10 is logically located outside of access network 4 and despite subscriber data traffic 26 being sourced by/destined to a public network address for PDN 12M, as shown in the example of FIG. 1. In addition, registering with and publishing the private network address and, in some instances, other address/port information for subscriber devices 6 using RADIUS server 16 or another AAA server allows RADIUS server 16 to publish the information to any requesting device logically located on interface 24. This may reduce signaling traffic between network access gateway 8 and services node 10 that otherwise be required to publish the private network address and other address/port information to multiple nodes. However, in some instances, network access gateway 8 may publish the private network address and, in some instances, other address/port information for subscriber devices 6 directly to services node 10.

Figure 2:
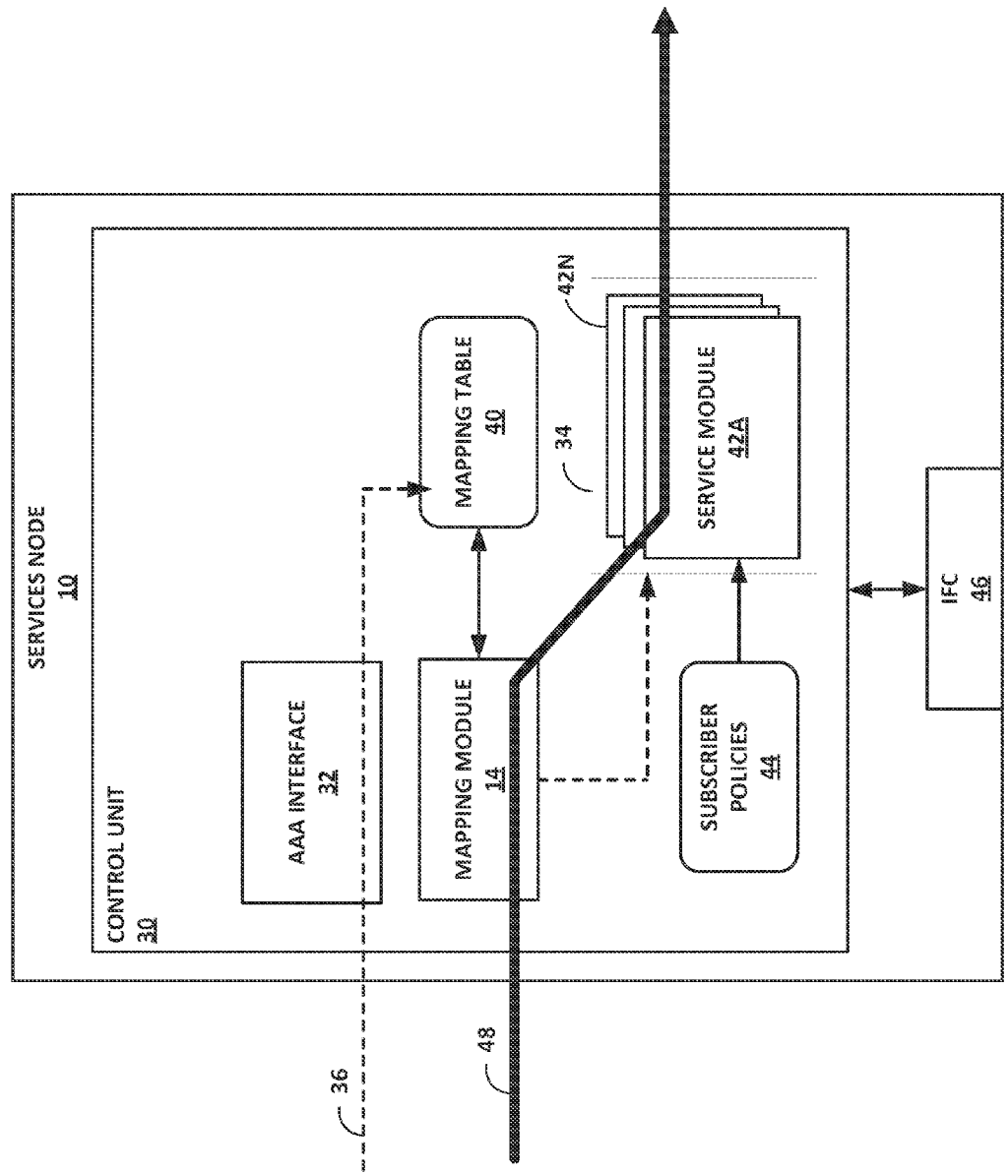
FIG. 2 is a block diagram illustrating, in detail, an example instance of a services node, logically located on an interface external to an access network, which deduces private network addresses for subscriber devices within the access network according to techniques described in this disclosure.

FIG. 2 is a block diagram illustrating, in detail, an example instance of a services node, logically located on an interface external to an access network, which determines private network addresses for subscriber devices within the access network according to techniques described in this disclosure. Services node 10 includes control unit 30 and network interface card (IFC) 46. Operation of services node 10 is described in the context of network system 2 of FIG. 1. Network access gateway 8 and RADIUS server 16 may include components similar to those described with respect to service node 10, such as a control unit 30, IFC 46, and AAA interface 32.

Network interface card 46 of services node 10 exchanges network packets with other network devices with which IFC 46 is coupled via communication links Network interface card 46 provides received network packets to control unit 30 for processing and outputs processed network packets received from control unit 30. Network interface card 46 may represent a plurality of IFCs.

Control unit 30 of services node 10 provides an operating environment for executing modules, which in the illustrated example include AAA interface 32, mapping module 14, and one or more service modules 42A-42N ("service modules 42"). Control unit 30 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. In this example, control unit 30 also includes computer-readable storage media to store mapping table 40 and subscriber policies 44 data structures, which may include flat files, databases, tables, trees, and/or lists, for example.

AAA interface 32 implements the RADIUS protocol to, among other function, receive and process RADIUS messages, including reflected RADIUS message 36 from RADIUS server 16. Reflected RADIUS message 36 may represent an example instance of reflected AAA message 22B of FIG. 1. AAA interface 32 stores the private network address for a subscriber device, along with additional network address and/or port range information, included in reflected RADIUS message 36 to mapping table 40.

Mapping table 40 is a data structure that stores subscribers' network address information for use by mapping module 14 in translating public network addresses of subscriber data traffic 48 received by services node 10 to the corresponding subscribers' private network addresses. Mapping table 40 stores a record of the private network address for the subscriber device associated with reflected RADIUS message 36 and, in some instances, stores a public network address and/or port range information in associated with the private network address. Mapping table 40 may store additional such records for other subscriber devices.

Service modules 42 make up service plane 34 of services node 10 and apply subscriber-aware services to subscriber data traffic 48 received by services node 10. In general, control unit 30 relays subscriber data traffic 48 to service modules 42, which selectively apply services to subscriber data traffic 48 in accordance with subscriber policies 44. Subscriber policies 44 include one or more policies that differentiate among different subscriber devices in order to specify differentiated services for application by service modules 42. A service provider may configure subscriber policies 44, or services node 10 may dynamically retrieve a subscriber policy from a policy server upon detecting new subscriber traffic or receiving a subscriber setup notification for the corresponding subscriber, such as RADIUS message 36. Subscriber policies 44 thus direct the operations of service modules 42. The term "policy" may refer to any data that affects the application of services by service modules 42 on a subscriber-specific or subscriber-group-specific basis. For example, subscriber policies 44 may specify additional operations with respect to subscriber data traffic 48 regarding encryption, tunneling, packet filtering, deep packet inspection, intrusion detection and prevention, and so on.

Service modules 42 may represent different processes or software modules executed by control unit 30 to perform respective services. For example, service module 42A may provide firewall services, service module 42B may provide Carrier-grade NAT, and so forth. In some instances, one or more of service modules 42 represents a service card installed along a backplane or other interconnect of services node 10 to apply one or more of the aforementioned services to subscriber data traffic 48. Generally, control unit 30 relays subscriber data traffic 48 received from IFC 46 to service modules 42.

In some instances, control and forwarding plane functionality of control unit 30 is bifurcated to include separate control/routing and forwarding units. In such instances, the forwarding unit (or "forwarding engine") may include a flow steering unit to selectively direct packets to service modules 42 for processing. For example, the flow steering unit may receive incoming packet flows of subscriber data traffic and determine whether to send the packets through service modules 42 for processing, or whether to bypass the service modules 42. An example forwarding plane configuration for separation of services and forwarding in an integrated services router may be found in U.S. patent application Ser. No. 12/432,366, entitled "Scalable Security Services for Multicast in a Router Having Integrated Zone-Based Firewall," filed on Apr. 29, 2009, the entire contents of which is incorporated by reference herein.

Subscriber data traffic 48 includes both upstream and downstream subscriber data traffic for one or more subscriber sessions established by network access gateway 8 for delivery PDNs 12 services to subscriber devices 6. Subscriber data traffic 48 includes network packets each having a network packet header with a public source network address and a public destination network address that are routable on interface 24 between network access gateway 8 and one or more of PDNs 12.

Mapping module 14 translates public network addresses of subscriber data traffic 48 to private network addresses received in RADIUS messages from RADIUS server 16 (e.g., RADIUS message 36) and stored to mapping table 40. For example, mapping module 14 may inspect network packets of subscriber data traffic 48 that are associated with a certain subscriber device attached to access network 4 and that have a public destination network address. Mapping module 14 uses mapping table 40, in accordance with techniques described herein, to translate the public destination network address to the private network address for the subscriber device received in RADIUS message 36, for example. Translation techniques are described in further detail below with respect to FIGS. 5-6.

Mapping module 14 notifies service modules 42 of translated private network addresses to allow service modules 42 to apply subscriber-aware services to subscriber data traffic 48. For example, mapping module 14 may provide an association of a public network address and a private network address; or an association of a public network address, public port range information, and a private network address; to service module 42. Service module 42 may then use the associations to quickly determine private network addresses for subscriber data traffic 48 and associated subscriber devices to enable application of subscriber-aware services in accordance with subscriber policies 44. For example, service modules 42 may look up a private network address of a subscriber device in subscriber policies 44 to identify one or more subscriber-specific (or subscriber-group-specific) policies to apply to subscriber data traffic 48 having the associated public network address (or the associated public network address and public port range) In some instances, an instance of mapping module 14 and/or mapping table 40 may be incorporated within one or more of service modules 42 to perform substantially similar translation functionality.

Figure 3:
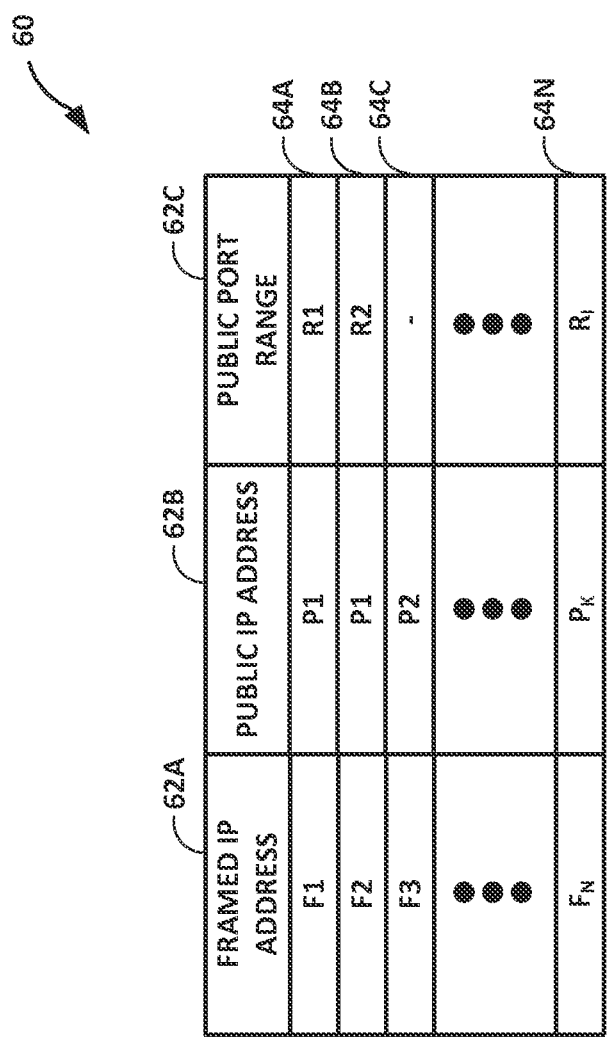
FIG. 3 is an associative data structure illustrating an example instance of a mapping table that accords with techniques described herein.

FIG. 3 is an associative data structure illustrating an example instance of a mapping table that accords with techniques described herein. Mapping table 60 of FIG. 3 may represent an example of mapping table 40 of services node 10 of FIG. 2 or mapping table 18 of RADIUS server 16 of FIG. 1.

In this example, mapping table 60 includes a plurality of mapping records 64A-64N (collectively, "mapping records 64") that each associates a private network address or other unique identifier for a subscriber in Framed IP Address column 62A with a public network address in Public IP Address column 62B and, in some instances, with a public port range in Public Port Range column 62C. For example, mapping record 64A associates private network address F1 with public network address P1 and with public port range R1. However, mapping record 64B associated private network address F2 with same public network address P1 and a different public port range R2. Ranges may be specified by a minimum and maximum for the range, as a base and length for the range, or using some other range quantifiers.

Mapping module 14 may use mapping records 64A, 64B to perform NAPT with respect to subscriber data traffic. Mapping record 64C associates private network address F3 with public network address P2 but not a public port range. Mapping module 14 may use mapping record 64C to perform static NAT with respect to subscriber data traffic. In some instances, mapping table 60 includes a simple list of private network address for use in obtaining subscriber policies 44 or for use by mapping module 14 in some implementations of deterministic NAT. RADIUS server 16 may use an example instance of mapping table 60 to store mapping records for publication to requesting devices, such as services node 10.

Figure 4:
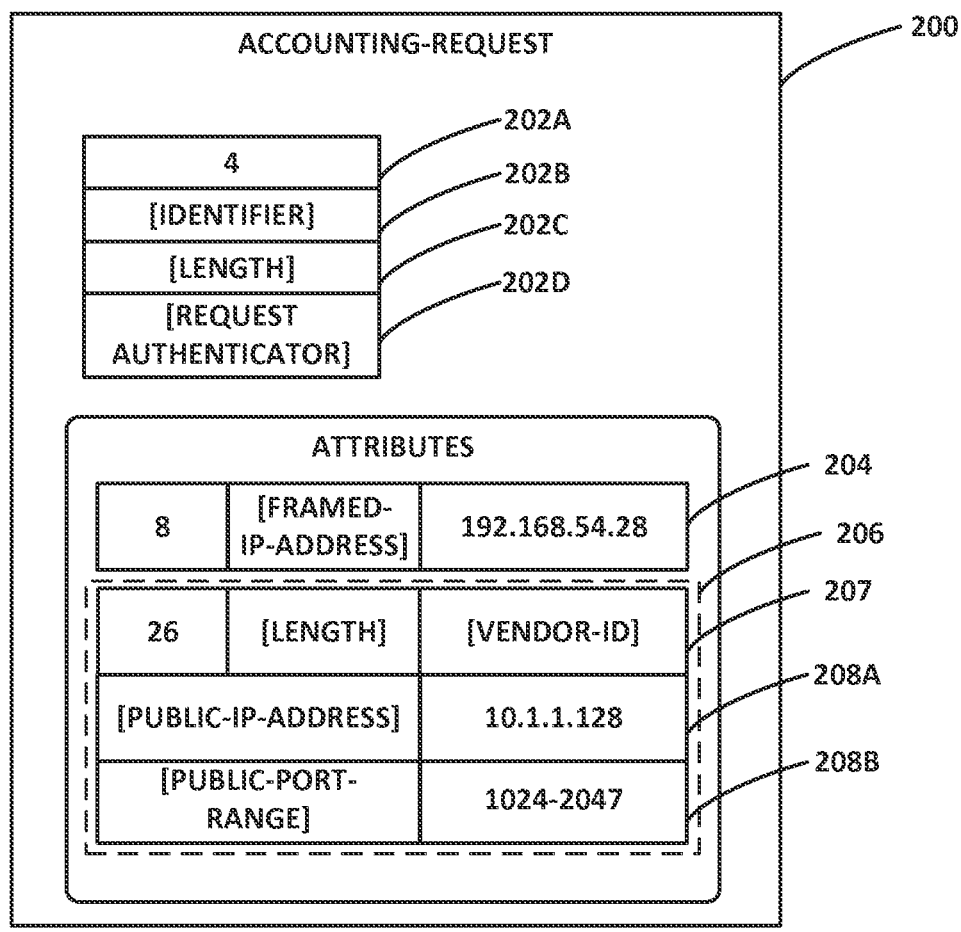
FIG. 4 is a block diagram illustrating an example Authentication, Authorization, and Accounting message that includes a private network address and a public network address in accordance with techniques described herein.

FIG. 4 is a block diagram illustrating an example Authentication, Authorization, and Accounting (AAA) message that includes a private network address and a public network address in accordance with techniques described herein. RADIUS Accounting Request message 200 (hereinafter, "accounting request message 200") may represent an example instance of AAA message 22A or reflected AAA message 22B of FIG. 1, or AAA message 36 of FIG. 2. Accounting request message 200, while described as a RADIUS Accounting Request message, may in some examples be another RADIUS request message (e.g., a RADIUS Access Request message), another type of RADIUS message, or a message for another AAA protocol (e.g., a Diameter message).

In the illustrated example, accounting request message 200 includes code field 202A identifying the type of RADIUS message (in this case an Accounting Request). Identifier field 202B aids in matching RADIUS Accounting Requests to corresponding RADIUS Accounting Replies. Length field 202C indicates the length of accounting request message 200. Request authentication field 202D may authenticate messages between the issuing RADIUS client (e.g., RADIUS server 16 or network access gateway 8) and the receiving RADIUS server (e.g., RADIUS server 16 or services node 10) using a shared secret known to both entities. Accounting request message 200 may include additional fields not illustrated.

Fields 204 and 206 specify different attributes for accounting request message 200. Framed-IP-Address field 204 is an attribute that includes a private IP address (i.e., a private network address), 192.168.54.28, for a subscriber device for which a network access gateway for an access network has issued a RADIUS Accounting-Request message corresponding to accounting request message 200. Vendor-Specific Attribute (VSA) Field 206 includes an initial Type-Length-Value (TLV) object 207 that specifies an identifier for the vendor ("[VENDOR-ID]") and extended attributes 208A-208B that extend the AAA protocol (e.g., RADIUS), including RADIUS Accounting Request messages or other AAA protocol messages, in accordance with techniques described herein. VENDOR-ID may identify a vendor of services node 10 and/or network access gateway 8 of FIG. 1, for example. Public-IP-Address extended attribute 208A specifies a public IP address (i.e., a public network address), 10.1.1.128, for the subscriber device that has the private IP address specified in Framed-IP-Address field 204. In this way, accounting request message 200 associates the private network address and public network address of the subscriber device. Public-Port-Range extended attribute 208B is an example of port range information, specifying a public port range, i.e., ports 1024-2047, for the subscriber device that has the private IP address specified in Framed-IP-Address field 204. In this way, accounting request message 200 associates the private network address and the public port range for the subscriber device. In some instances, accounting request message 200 does not include Public-IP-Address extended attribute 208A and/or Public-Port-Range extended attribute 208B.

Services node 10 may receive an instance of accounting request 200 and extract the attributes included therein, i.e., Frame-IP-Address field 204, Public-IP-Address extended attribute 208A, and Public-Port-Range extended attribute 208B. Services node 10 then stores the corresponding values to a mapping table, such as mapping table 40 of FIG. 2, for use in translating public network addresses of subscriber data traffic to private network addresses that permit subscriber discrimination and application of subscriber-aware services. In some instances, network access gateway 8 and services node 10 perform deterministic NAT to translate public network address/public port to private network address/private port for subscriber devices 6. In such instances, Framed-IP-Address field 204 includes the private network address for the subscriber device.

Figure 5:
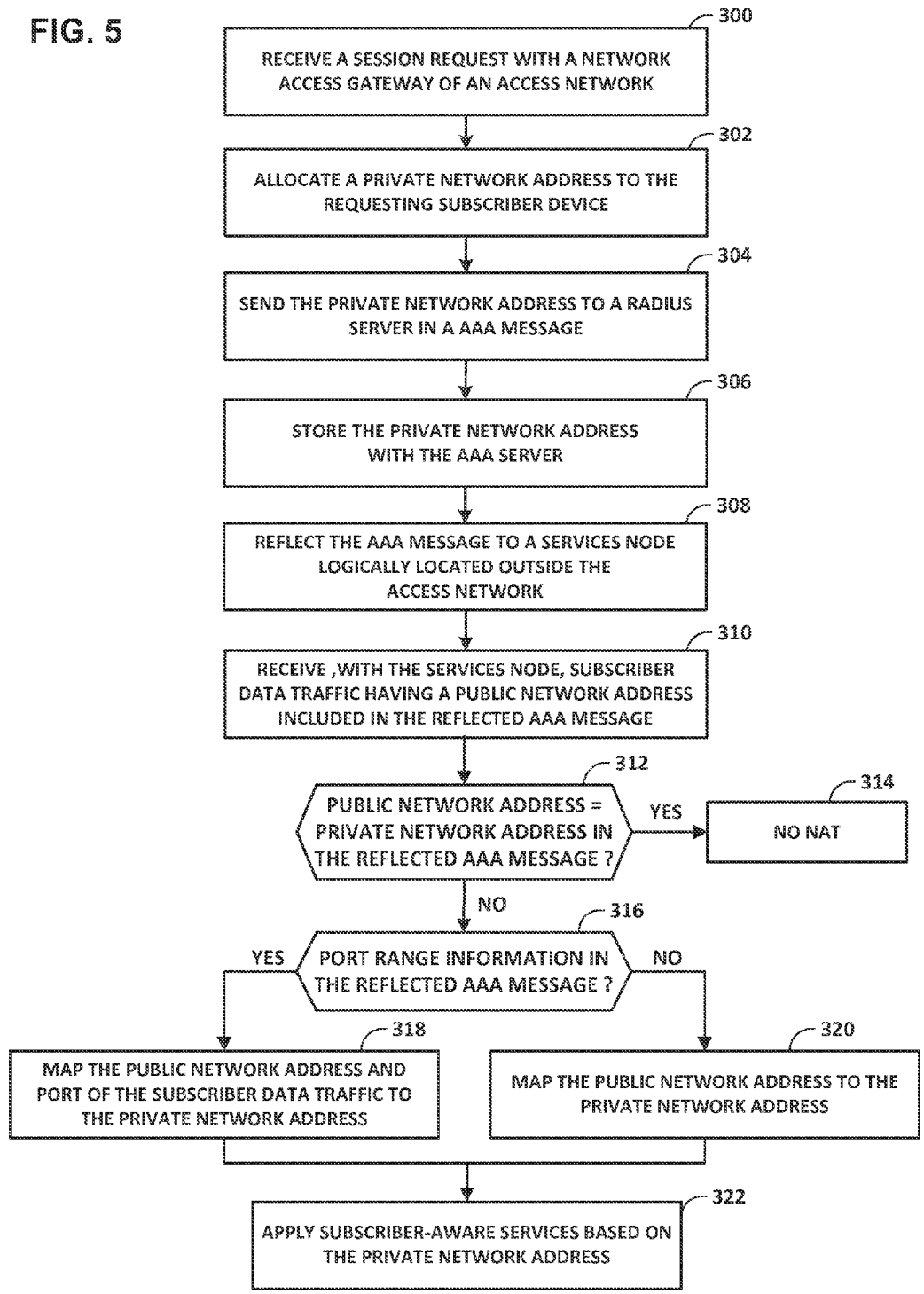
FIG. 5 is a flowchart illustrating an example mode of operation of a system that includes network devices that publish a private network address for a subscriber device in an Authentication, Authorization, and Accounting message and translate a public network address of subscriber data traffic to the private network address to apply subscriber-aware services in accordance with techniques described in this disclosure.

FIG. 5 is a flowchart illustrating an example mode of operation of a system that includes network devices that publish a private network address for a subscriber device in a AAA message and translate a public network address of subscriber data traffic to the private network address to apply subscriber-aware services in accordance with techniques described in this disclosure. This example mode of operation is, for illustrative purposes, described with respect to network system 2 of FIG. 1.

Initially, network access gateway 8 of access network 4 receives session request 20 from subscriber device 6N requesting services of PDN 12M (300). Network access gateway 8 allocates a private network address for access network 4 for the requested service session to subscriber device 6N (302), and network access gateway 8 sends the allocated private network address to RADIUS server 16 in AAA message 22A (304). The AAA message 22A may include additional addressing information, such as a separate public network address (i.e., distinguished from the private network address) and a port range.

RADIUS server 16 stores the private network address for subscriber device 6N to mapping table 18 (306). RADIUS server 16 reflects, as reflected AAA message 22B, AAA message 22A to services node 10 that is logically located outside of access network 4 and therefore unable to route subscriber data traffic that specifies private network addresses routable only within access network 4 (308). Services node 10 subsequently receives subscriber data traffic for the requested service session, which is sourced by/destined to a public network address that is included in a field or attribute of reflected AAA message 22B (310). If the public network address of the subscriber data traffic is also the private network address (e.g., in a Framed-IP-Address field of a RADIUS message) included in reflected AAA message 22B (YES branch of 312), then network access gateway 8 does not perform NAT, for the private network address allocated by network access gateway 8 for the requested service session is routable within PDN 12M. Services node 10 therefore similarly does not perform NAT with respect to the subscriber data traffic (314).

If the public network address is not the private network address included in reflected AAA message 22B (NO branch of 312), the public network address was included as a public network address in AAA message 22B separate from a private network address included in AAA message 22B (e.g., as a VSA separate from a Framed-IP-Address of a RADIUS message). If reflected AAA message 22B also included port range information (YES branch of 316), services node 10 performs reverse NAPT to map the public network address and port of the subscriber data traffic to the private network address of subscriber device 6N, thereby identifying the subscriber device (318). If reflected AAA message 22B did not include port range information (NO branch of 316), services node 10 performs static NAT to map the public network address to the private network address of subscriber device 6N (318). Having identified the private network address of subscriber device 6N, services node 10 applies subscriber-aware services to the subscriber data traffic associated with subscriber device 6N (320).

Figure 6:
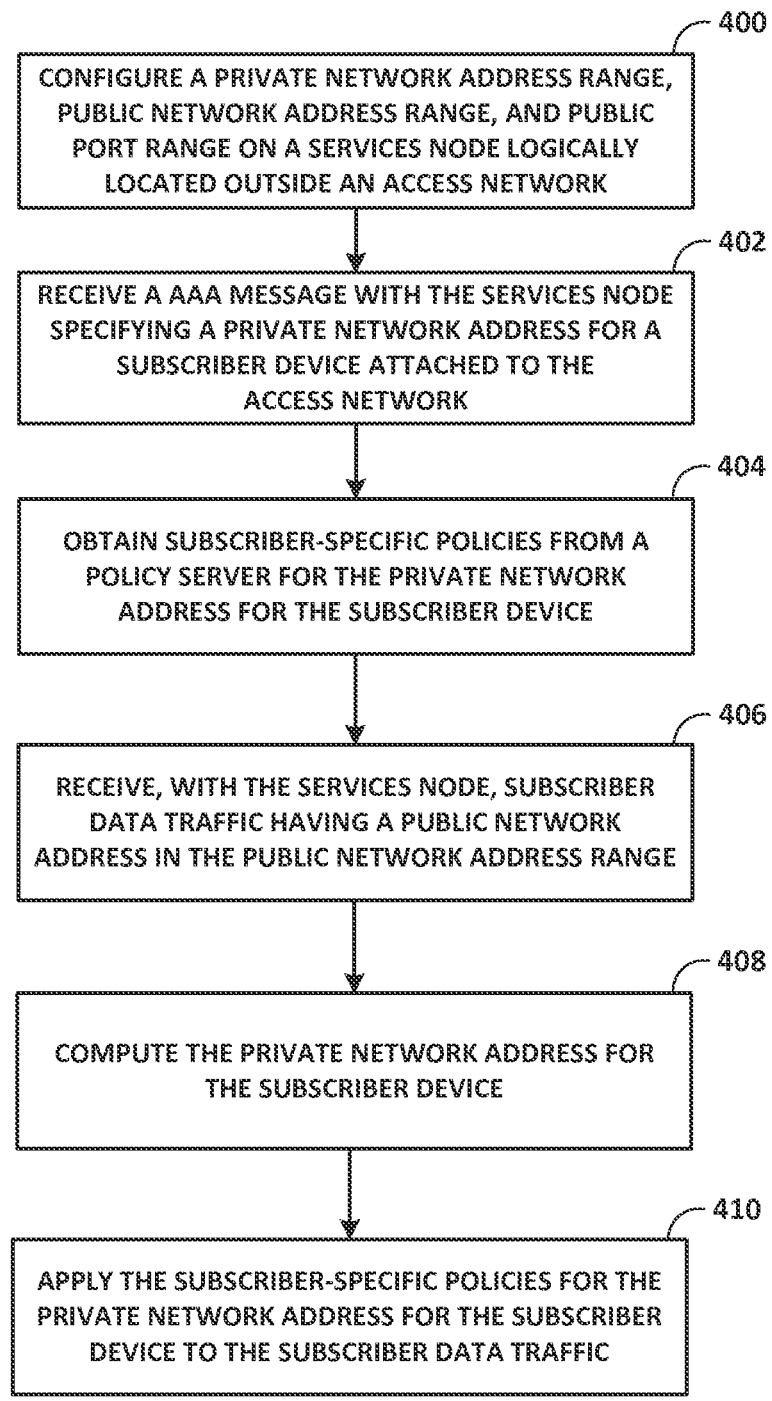
FIG. 6 is a flowchart illustrating an example mode of operation of a services node to translate a public network address/public port to a private network address/private port to apply subscriber-aware services to subscriber data traffic according to techniques described herein.

FIG. 6 is a flowchart illustrating an example mode of operation of a services node to translate a public network address/public port to a private network address/private port to apply subscriber-aware services to subscriber data traffic according to techniques described herein. This example mode of operation is described with respect to services node 10 of FIGS. 1-2. Initially, a service provider, administrator, or other entity configures services node 10 with a public network address range, public port range, and private network address range for network access gateway 8 that performs deterministic NAT to translate public network address range/public port to a private network address/private port and visa-versa (400). Services node 10 stores the configured information as configuration data. Subsequently, services node 10 receives a AAA message that specifies a private network address that is within the configured private network address range and that is associated with one of subscriber devices 6 attached to network access gateway 8 (402). Services node 10 uses the private network address received in the AAA message to obtain subscriber-specific policies for the subscriber device 6 and stores the subscriber-specific policies to subscriber policies 44 (404).

Services node 10 subsequently receives subscriber data traffic that is sourced by/destined to a public network address that is in the configured public network address range (406). Based on the public network address/public port of the subscriber data traffic and the configured public network address range, public port range, and private network address range, mapping module 14 performs deterministic NAT to compute or otherwise identify the private network address for the subscriber device 6 (408). In some examples, mapping module 14 performs deterministic NAT to compute the private network address for the subscriber device 6 according to the following function:

$$\text{Public Network Address Range:}[PublicBase, PublicHigh]$$
$$\text{Private Network Address Range:}[PrivateBase, PrivateHigh]$$
$$\text{Public Port Range:}[PortBase, PortHigh]$$
$$PortRangeSize = PortHigh - PortBase + 1$$
$$NumPrivatePerPublic = PortRangeSize / PortBase$$
$$\text{Private Network Address} = \text{Private Base} +$$
$$(\text{Public Network Address} - \text{Public Base}) * NumPrivatePerPublic +$$
$$(\text{Public Port} - PortBase) / PortRangeSize$$

In the above example, the private port range may be [0, PortBase-1]. Additional examples of deterministic NAT are found in U.S. patent application Ser. No. 13/326,903, filed Dec. 15, 2011, and entitled "DETERMINISTIC NETWORK ADDRESS AND PORT TRANSLATION," which is incorporated in its entirety by reference herein. Mapping module 14 having computed the private network address for the subscriber data traffic, services node 10 identifies the obtained subscriber-specific policies in subscriber policies 44 for the private network address and applies the obtained subscriber-specific policies to the subscriber data traffic (410).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for applying a subscriber service to subscriber data traffic, the method comprising:
  receiving, by a services node from an Authentication, Authorization, and Accounting (AAA) server, an AAA message that has been extended from an AAA protocol to specify a private network address of a subscriber device authenticated to an access network and assigned the private network address that is not routable external to the access network, wherein the services node is logically located external to the access network on an interface between a packet data network and a network access gateway that performs Network Address Translation (NAT) for the access network;
  receiving, by the services node, subscriber data traffic that is destined to a public network address that is routable by the packet data network;
  associating, by the services node, the public network address of the subscriber data traffic with the private network address specified by the AAA message;
  selecting, by the services node, a policy using the private network address associated with the public network address;
  applying, by the services node, the subscriber service to the subscriber data traffic associated with the private network address in accordance with the policy; and
  sending the subscriber data traffic from the services node to the network access gateway.

2. The method of claim 1, wherein the AAA message specifies the public network address for a Network Address Translation operation on the subscriber data traffic associated with the subscriber device.

3. The method of claim 2, further comprising:
  storing an association of the private network address and the public network address to a mapping table of the services node, wherein associating the public network address of the subscriber data traffic with the private network address comprises performing static Network Address Translation using the association.

4. The method of claim 2,
  wherein the AAA message comprises a Remote Access Dial In User Service (RADIUS) request message that conforms to a RADIUS protocol,
  wherein the RADIUS request message comprises a Framed-IP-Address field that includes the private network address, and
  wherein the RADIUS request message comprises a Vendor-Specific Attribute field that includes the public network address.

5. The method of claim 2, wherein the AAA message specifies a public port range for the subscriber device, the method further comprising:
  storing an association of the private network address, the public network address, and the public port range to a mapping table of the services node, wherein associating the public network address of the subscriber data traffic with the private network address comprising performing network address and port translation using the association.

6. The method of claim 5,
  wherein the AAA message comprises a Remote Access Dial In User Service (RADIUS) request message that conforms to a RADIUS protocol,
  wherein the RADIUS request message comprises a Framed-IP-Address field that includes the private network address, and
  wherein the RADIUS request message comprises a Vendor-Specific Attribute field that specifies the public network address in a first extended attribute of the Vendor-Specific Attribute field and specifies the public port range in a second extended attribute of the Vendor-Specific Attribute field.

7. The method of claim 1 further comprising:
  registering the services node with the AAA server to cause the AAA server to send the AAA message.

8. The method of claim 1, further comprising:
  storing configuration data specifying a private network address range, a public network address range, and a public port range,
  wherein associating the public network address of the subscriber data traffic with the private network address specified by the AAA message comprises computing the private network address using deterministic NAT based at least on the private network address range, the public network address range, the public port range, the public network address of the subscriber data traffic, and a public port of the subscriber data traffic.

9. The method of claim 1, wherein the services node does not modify layer 3 headers of the subscriber data traffic.

10. A method for publishing private network address information, the method comprising:
  receiving, by a network access gateway of an access network that performs network address translation (NAT) for the access network, a session request from a subscriber device for a service session with a packet data network;

associating a public network address with a private network address for the subscriber device, wherein the public network address is routable within the packet data network;

sending, by the network access gateway, the private network address and the public network address to an Authentication, Authorization, and Accounting (AAA) server in a first AAA message, wherein the first AAA message specifies the private network address for the subscriber device;

sending, by the AAA server, a second AAA message that includes the private network address and the public network address to a services node to announce the public address and the private network address for the subscriber device to the service node, wherein the service node is logically located external to the access network on an interface between the packet data network and the network access gateway;

receiving, by the services node, the second AAA message and subscriber data traffic;

by the services node upon determining the subscriber data traffic is destined to the public network address, selecting a policy using the private network address associated with the public network address;

applying a subscriber service to the subscriber data traffic associated with the private network address in accordance with the policy; and sending the subscriber data traffic from the services node to the network access gateway.

11. The method of claim 10,
wherein the first AAA message comprises a Remote Access Dial In User Service (RADIUS) request message that conforms to a RADIUS protocol,
wherein RADIUS request message comprises a Framed-IP-Address field that includes the private network address, and
wherein the RADIUS request message comprises a Vendor-Specific Attribute field that includes the public network address.

12. The method of claim 10, further comprising:
associating a public port range with the private network address for the subscriber device, wherein the first AAA message comprises a Remote Access Dial In User Service (RADIUS) request message that conforms to a RADIUS protocol,
wherein RADIUS request message comprises a Framed-IP-Address field that includes the private network address, and
wherein the RADIUS request message comprises a Vendor-Specific Attribute field that specifies the public network address in a first extended attribute of the Vendor-Specific Attribute field and specifies the public port range in a second extended attribute of the Vendor-Specific Attribute field;
receiving, by the network access gateway, the subscriber data traffic, the subscriber data traffic destined to the public network address and a port within the public port range; and
responsive to applying, by the network access gateway, network address and port translation to translate the public network address and the port to the private network address and generate modified subscriber data traffic routable destined to the private network address, forwarding the modified subscriber data traffic from the network access gateway toward the private network address.

13. The method of claim 10, wherein the session request comprises an Access Point Name associated with the packet data network, and
wherein the public network address comprises a virtual private network (VPN) address that is routable within a VPN for the packet data network.

14. A method comprising:
receiving, by an Authentication, Authorization, and Accounting (AAA) server from a network access gateway of an access network that performs network address translation (NAT) for the access network, a first AAA message that comprises a private network address for a subscriber device attached to the access network; and
sending, by the AAA server to a services node, a second AAA message that includes the private network address to announce the private network address for the subscriber device to the services node to enable the services node to perform NAT for the subscriber device to associate a public network address for the subscriber device with the private network address for the subscriber device, wherein the services node is logically located external to the access network on an interface between a packet data network and the network access gateway.

15. The method of claim 14, wherein the first AAA message further comprises the public network address, and wherein the second AAA message further comprises the public network address.

16. The method of claim 15,
wherein the first AAA message comprises a Remote Access Dial In User Service (RADIUS) request message,
wherein RADIUS request message comprises a Framed-IP-Address field that includes the private network address, and
wherein the RADIUS request message comprises a Vendor-Specific Attribute field that includes the public network address.

17. The method of claim 15, wherein the first AAA message further comprises a public port range for the subscriber device,
wherein the second AAA message further comprises the public port range.

18. The method of claim 17,
wherein the first AAA message comprises a Remote Access Dial In User Service (RADIUS) request message that conforms to a RADIUS protocol,
wherein RADIUS request message comprises a Framed-IP-Address field that includes the private network address, and
wherein the RADIUS request message comprises a Vendor-Specific Attribute field that specifies the public network address in a first extended attribute of the Vendor-Specific Attribute field and specifies the public port range in a second extended attribute of the Vendor-Specific Attribute field.

19. A services node comprising:
a control unit having a processor;
an Authentication, Authorization, and Accounting (AAA) interface of the control unit to receive, from an AAA server, an AAA message that has been extended from an AAA protocol to specify a private network address of a subscriber device authenticated to an access network and assigned the private network address that is not routable external to the access network, wherein the services node is logically located external to the access network on an interface between a packet data network and a network access gateway that performs Network Address Translation (NAT) for the access network;
one or more network interface cards to receive subscriber data traffic that is destined to a public network address that is routable by the packet data network;
a mapping module of the control unit to associate the public network address of the subscriber data traffic with the private network address specified by the AAA message;
one or more subscriber policies; and
one or more service modules to select a subscriber policy of the subscriber policies using the associated private network address and apply a service to the subscriber data traffic associated with the private network address in accordance with the selected subscriber policy.

20. The services node of claim 19, wherein the AAA message specifies the public network address for a Network Address Translation operation on the subscriber data traffic associated with the subscriber device.

21. The services node of claim 20, further comprising:
a mapping table to store an association of the private network address and the public network address, wherein associating the public network address of the subscriber data traffic with the private network address comprises performing static Network Address Translation using the association.

22. The services node of claim 20,
wherein the AAA message comprises a Remote Access Dial In User Service (RADIUS) request message that conforms to a RADIUS protocol,
wherein the RADIUS request message comprises a Framed-IP-Address field that includes the private network address, and
wherein the RADIUS request message comprises a Vendor-Specific Attribute field that includes the public network address.

23. The services node of claim 20, wherein the AAA message specifies a public port range for the subscriber device, the method further comprising:
a mapping table to store an association of the private network address, the public network address, and the public port range, wherein associating the public network address of the subscriber data traffic with the private network address comprising performing network address and port translation using the association.

24. The services node of claim 23,
wherein the AAA message comprises a Remote Access Dial In User Service (RADIUS) request message that conforms to a RADIUS protocol,
wherein the RADIUS request message comprises a Framed-IP-Address field that includes the private network address, and
wherein the RADIUS request message comprises a Vendor-Specific Attribute field that specifies the public network address in a first extended attribute of the Vendor-Specific Attribute field and specifies the public port range in a second extended attribute of the Vendor-Specific Attribute field.

25. The method of claim 19 wherein the AAA interface registers the services node with the AAA server to cause the AAA server to send the AAA message.

26. The services node of claim 19, further comprising:
configuration data specifying a private network address range, a public network address range, and a public port range,
wherein to associate the public network address of the subscriber data traffic with the private network address specified by the AAA message, the mapping module computes the private network address using deterministic NAT based at least on the private network address range, the public network address range, the public port range, the public network address of the subscriber data traffic, and a public port of the subscriber data traffic.

27. The services node of claim 19, wherein the services node does not modify layer 3 headers of the subscriber data traffic.

28. The services node of claim 19, wherein each of the one or more service modules comprises a service card that applies a different service to the subscriber data traffic.

29. A non-transitory computer-readable medium comprising instructions that, when executed, cause one or more processors of a services node to:
receive, from an Authentication, Authorization, and Accounting (AAA) server, an AAA message that has been extended from an AAA protocol to specify a private network address of a subscriber device authenticated to an access network and assigned the private network address that is not routable external to the access network, wherein the services node is logically located external to the access network on an interface between a packet data network and a network access gateway that performs Network Address Translation (NAT) for the access network;
receive subscriber data traffic that is destined to a public network address that is routable by the packet data network;
associate the public network address of the subscriber data traffic with the private network address specified by the AAA message;
select a policy using the private network address;
apply the subscriber service to the subscriber data traffic associated with the private network address in accordance with the policy; and
send the subscriber data traffic from the services node to the network access gateway.

30. An Authentication, Authorization, and Accounting (AAA) server that authenticates subscriber devices requesting access to an access network, the AAA server comprising:
a control unit having a processor;
an Authentication, Authorization, and Accounting interface of the control unit to receive, from a network access gateway of the access network that performs network address translation (NAT) for the access network, a first AAA message that comprises a private network address for a subscriber device attached to the access network,
wherein the AAA interface sends, to a services node, a second AAA message that includes the private network address to announce the private network address for the subscriber device to the services node to enable the services node to perform NAT for the subscriber device to associate a public network address for the subscriber device with the private network address for the subscriber device, wherein the services node that is logically located external to the access network on an interface between a packet data network and the network access gateway.

* * * * *